UNITED STATES PATENT OFFICE.

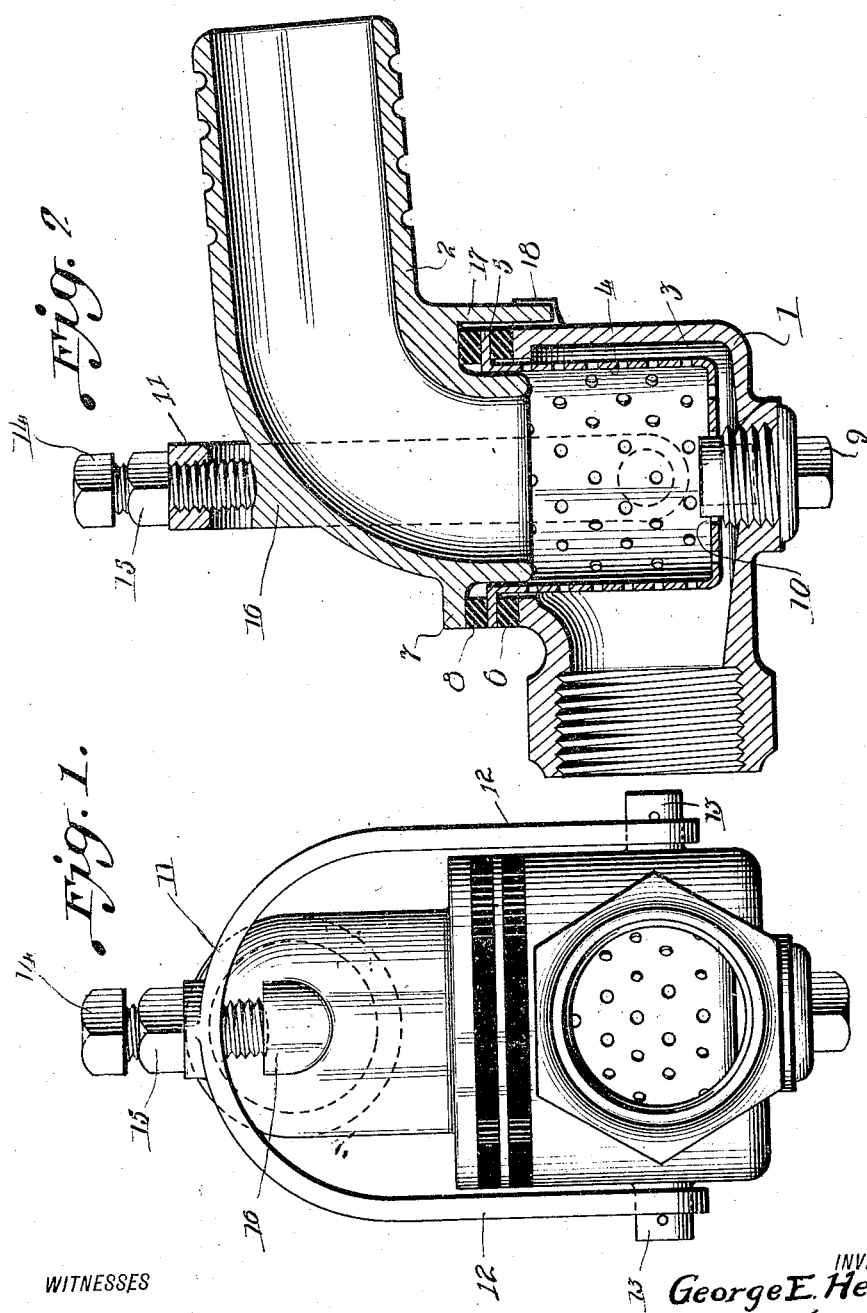

GEORGE ELSEWORTH HEYSER, OF MANCHESTER, GEORGIA.

LOCOMOTIVE-TANK HOSE CONNECTION AND STRAINER.

1,299,466.

Specification of Letters Patent.

Patented Apr. 8, 1919.

Application filed January 10, 1919. Serial No. 270,565.

*To all whom it may concern:*

Be it known that I, GEORGE E. HEYSER, a citizen of the United States, and a resident of Manchester, in the county of Meriwether and State of Georgia, have invented certain new and useful Improvements in Locomotive-Tank Hose Connections and Strainers, of which the following is a specification.

My invention is an improvement in hose connection and strainers, and has for its object to provide a connection of the character specified, especially adapted for use between a locomotive and its tender, for the purpose of coupling tank hose and thoroughly removing from the water by straining all scale and the like, which would interfere with the proper working of the injector, and wherein the connection is of such dimensions as to permit a sufficiently large body of water to pass, and is so constructed that even when the strainer is partly choked, there will be still room for free passage of water.

Another object of the invention is to provide a device which may be readily cleaned and the tank hose connected or disconnected without the usual jar of hammering.

In the drawings:—

Figure 1 is a front view of the improved connection, and

Fig. 2 is a longitudinal vertical section.

In the present embodiment of the invention, the improved connection consists of two sections, namely, a strainer casing section 1, and a hose connection section 2. This section 1 of the connection has a chamber 3 therein, and one end of the hose connection 2 engages the section 1 at this chamber. The section has an opening at the chamber for receiving the connection, the said opening being of approximately the same cross section as that of the strainer to be described.

The strainer 4 is of substantially cup shape having at its free edge a marginal outwardly extending flange 5, and a gasket 6 is arranged between this flange and the section 1 about the opening for the connection 2.

It will be understood that the flange 5 extends beyond the inner edge of the opening for the hose connection section. This hose connection section extends into the strainer as shown in Fig. 2, and it has an annular rib 7 which engages a gasket 8 arranged upon the flange 5 of the strainer.

A suitable clamp to be described is provided for clamping the section 2 to the section 1. The section 1 has a drain opening at the center of the strainer and at the axis of that portion of the connection section 2 which engages within the section 1, and this opening is normally closed by a threaded plug 9, which may be removed to drain the chamber 3 and the strainer 4.

The strainer has a central opening 10 in its bottom and the plug has a plain portion fitting within this opening as shown. The clamping device consists of a yoke composed of a body 11 and arms 12, and arms are journaled on journal pins 13 extending laterally from the section 1, the arms of the yoke being held in place by cross pins as shown.

The body of the yoke carries a threaded opening, through which is threaded a set screw 14, the said set screw having a locking nut 15. The set screw is adapted to engage an integral lug 16 on the section 2, and it will be obvious that when the yoke is swung into the position of Figs. 1 and 2, and the set screw tightened, the sections 1 and 2 will be forced tightly together forming a water-tight joint, and with the lock nuts the parts may be firmly locked in position.

In order to take the lateral strain off the yoke and set screw after the parts have been clamped together, a lug 17 is provided on the opposite side of the hose section from the yoke, and this lug is adapted to engage between the forks of a lug 18, in such manner that when the parts are coupled together the lateral strain will be taken off the set screw and the yoke.

Access may be had to the strainer, and the strainer may be removed by uncoupling the sections. To clean the strainer however, it is only necessary to remove the plug, and accumulations in the same may be washed from the opening in the bottom of the strainer. The strainer section in the present instance is of sheet brass or copper having openings, but it is obvious that it might be of any desired foraminous material.

Referring to Fig. 2 of the drawing it will be noticed that the hose connection 2 inclines upwardly from the element 1, and that there is a cavity or recess in the inner end of the drain plug, the said recess being shown in dotted lines in Fig. 2. The construction gives the hose a natural curve, thereby permitting a shorter hose than is generally used and prevents kinking.

I claim:—

1. A locomotive tank hose connection and strainer, comprising a hose connection section and a strainer section, said last named section having a strainer chamber, a strainer held in the chamber, said strainer being cup shaped and having at its top end a marginal laterally extending flange, said flange being received between the sections, means for clamping the sections on the flange, the strainer section having a drain opening at the center of the strainer and the strainer having an opening registering therewith, and a drain plug having threaded engagement with the opening of the casing section and engaging the opening of the strainer.

2. A device of the character specified comprising a cup shaped strainer, a sectional connection, the strainer having a marginal flange at its top received between the abutting edges of the sections, the cup having an opening in its bottom and the adjacent section having an opening registering therewith, and a drain plug having threaded engagement with the opening of the section and engaging the opening of the strainer to close said opening.

GEORGE ELSEWORTH HEYSER.

Copies of this patent may be obtained for five cents each, by addressing the "Commissioner of Patents, Washington, D. C."